April 25, 1967 C. H. SKINNER 3,316,369
FITTING FOR A HOSE HAVING SWITCH MEANS FOR REMOTELY
CONTROLLING VARIOUS DEVICES
Filed Nov. 18, 1965

INVENTOR.
CLAYTON H. SKINNER
BY John L. Shortley
ATTORNEY

3,316,369
FITTING FOR A HOSE HAVING SWITCH MEANS FOR REMOTELY CONTROLLING VARIOUS DEVICES
Clayton H. Skinner, Buffalo, N.Y., assignor to Hewitt-Robbins Incorporated, Stamford, Conn.
Filed Nov. 18, 1965, Ser. No. 508,476
7 Claims. (Cl. 200—61.58)

This invention relates to a novel fitting for a hose at the nozzle or discharge and carrying one or more switches which are provided for remotely controlling various devices at the opposite end of the hose. For example, one of the switches may control the hose reeling and unreeling apparatus, another switch may control starting and stopping a pump, and a further switch may control apparatus for computerized billing. All of the above-enumerated or similar functions being controlled from the nozzle or discharge end of the hose.

In addition to the foregoing, the fitting, according to the invention, also provides easier handling of the hose since it is preferably made from elastomeric material, such as rubber or similar elastomeric synthetic materials, which in cold weather allows the hose nozzle to be manipulated without grasping metal. Further, the life of the switches in the fitting is materially extended since the switches which are enclosed in the insulating material of the fitting are protected against damage if the hose nozzle is dropped or otherwise exposed to harsh use. Also, the person handling the hose is protected against electric shock.

A primary object of the invention therefore is to provide a novel remote-control-switch-fitting for a hose having the objects and advantages noted above.

The foregoing objects and advantages of the invention, and additional objects and advantages, will become apparent from the following detailed description of a presently preferred embodiment illustrated in the appended drawing in which.

Figure 1:
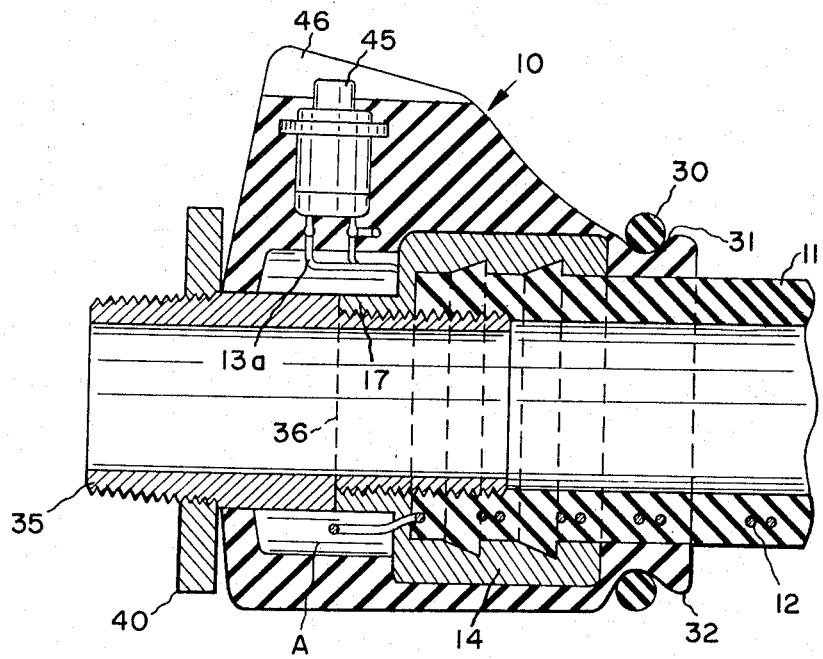
FIG. 1 is a longitudinal cross-sectional view of a fitting according to the invention attached to a hose.
Figure 2:
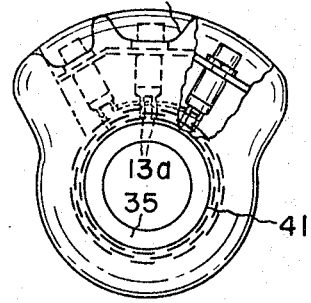
FIG. 2 is a front elevational view looking at the left end of the fitting as shown in FIG. 1.
Figure 3:
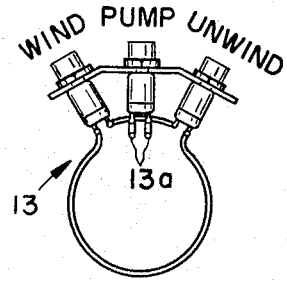
FIG. 3 is a detailed plan view of a switch and wiring assembly which is cast or molded integral with the hose fitting as shown in FIG. 1.
Figure 4:
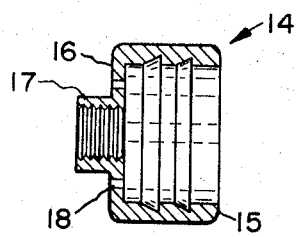
FIG. 4 is a detailed cross-sectional view of a ferrule shown in FIG. 1.

Referring to the drawing, FIG. 1 shows a remote control switch housing generally designated 10, of insulating material attached to the end of a hose 11 in which electric conductors 12 may be embedded. The conductors 12 are connected with relays (not shown) for controlling various functions, such as reeling and unreeling the hose, turning the pump "on" and "off" etc. which are located at the other end of the hose 11. The conductors 12 are connected in the usual manner to the switch assembly 13 which is embedded in the cast or moulded housing 10. A ferrule 14 for connecting the housing 10 to the hose 11 is also embedded as an integral part of the housing 10. The ferrule, which is of brass or other suitable material, consists of a hollow body portion 15, a radial shoulder or flange 16 and a hollow internally threaded sleeve 17. The portion 15 of the ferrule is adapted to receive the end of the hose 11 and the free end of the hose conductors are passed through bores 18 in the flange of the ferrule. After the end of the hose 11 is inserted in the ferrule portion 15, the fitting and hose are first held together by a clamp 30, of any suitable type, which is provided in the groove 31 of the housing collar 32. The ends of the wires 12 projecting from the hose are joined with the wires 13a projecting into chamber A of the housing 10 from the switch array 13. The chamber A is provided in the housing by forming a suitable recess which is large enough to receive the connected wire ends and the wire connectors (not shown). However, any suitable method may be used to connect the wires 12 and 13a which are stored in the chamber A after having been connected.

Once the wires have been connected and stored in chamber A, the tube or nozzle tailpiece 35 having an external thread, is introduced into the other end of the housing 10 and screwed into the sleeve 17 of the ferrule. The inner end of the tube 35 expands the hose 11 radially outwardly into gripping engagement with the internal undulations of ferrule portion 15. The tube 35 seals the wire ends 12 and 13a from the liquid conducted in the hose and closes off the chamber A from the exterior of the hose. An O ring or the like (not shown) may be provided between the shoulder 36 and the end of sleeve 17 may be provided for this purpose. The tube 35 projects beyond the housing 10 and is threaded to receive a hose nozzle (not shown). A lock nut 40 may be provided for securing the nozzle in place and, in addition, it may function to deform the housing 10 to insure a liquid-tight seal between the opening 41 in the housing through which the sleeve or tube 35 is introduced.

The switches are preferably provided with a push button operator 45 which projects from the housing 10 into a finger slot 46 formed in the housing. The slots 46 provide access to the push buttons 45 while the side walls of the housing defining the finger slots prevent accidental depression of the push buttons if the hose is dropped or laid down. A toggle type switch operator may also be utilized for one or more of the switches (not shown).

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed is:

1. A hose fitting for connecting a hose having electrical conductors therein with a switch assembly, said hose fitting comprising a housing member consisting of elastomeric material, said housing member having a bore therethrough, a ferrule secured in said housing member at one end thereof, said ferrule being adapted to receive a hose to be connected with said fitting, a switch assembly in said housing member, said switch assembly having switch conductors extending into said bore, a nozzle tailpiece receivable in the bore of said housing member and secured to said ferrule, said tailpiece extending axially from said housing member for receiving a hose nozzle, said tailpiece and said ferrule cooperating with the interior of said housing to form a chamber about said switch conductors for preventing fluid passed through said tailpiece from contacting said switch conductors.

2. A hose fitting according to claim 1, wherein said housing member is provided with one or more finger recesses in the exterior surface thereof, and said switch assembly is provided with an operator extending into each of said finger recesses.

3. A hose fitting according to claim 1 wherein said ferrule has bores extending therethrough for passing the electrical hose conductors which are to be electrically connected to said switch conductors of said switch assembly.

4. A hose fitting according to claim 1, wherein said housing member extends axially beyond said ferrule, said axial extension having a concentrically surrounding clamp means for securing said housing member on a hose received in the said housing bore.

5. A hose fitting according to claim 1, wherein said ferrule comprises a body portion for receiving the end of a hose to be connected with said fitting, a threaded sleeve portion for connecting said ferrule and tailpiece and a radial flange portion connecting said sleeve portion and said body portion, said radial flange having bores therethrough for passing the electrical hose conductors which are to be electrically connected with the conductors of said switch assembly.

6. A hose fitting according to claim 5, wherein said tailpiece extends into said body portion of said ferrule and into the hose for expanding the end of the hose into forced engagement with said ferrule.

7. A hose fitting according to claim 6, in combination with a hose, said hose having electric conductor means embedded in said hose carcass and extending from at least one end thereof for connection with the conductors of said switch assembly; said housing member having a chamber therein for storing said conductors, and means for sealing said recess.

References Cited by the Examiner
UNITED STATES PATENTS

| | | | |
|---|---|---|---|
| 1,850,966 | 3/1932 | Harris | 200—61.86 X |
| 2,301,781 | 11/1942 | Higbee | 200—61.86 X |
| 2,371,971 | 3/1945 | Main et al. | 285—247 X |
| 2,778,531 | 1/1957 | Lauer | 200—157 X |
| 2,955,183 | 10/1960 | Beach | 200—157 |

BERNARD A. GILHEANY, *Primary Examiner.*

J. J. BAKER, *Assistant Examiner.*